United States Patent [19]
Maligne

[11] Patent Number: 5,704,452
[45] Date of Patent: Jan. 6, 1998

[54] BRAKE PISTON AND PAD WITH AUTOMATIC COUPLING TOGETHER

[75] Inventor: Jean Charles Maligne, Aubervilliers, France

[73] Assignee: Robert Bosch Technology Corporation, Farmington Hills, Mich.

[21] Appl. No.: 624,567

[22] PCT Filed: Mar. 12, 1996

[86] PCT No.: PCT/FR96/00378

§ 371 Date: Apr. 10, 1996

§ 102(e) Date: Apr. 10, 1996

[87] PCT Pub. No.: WO96/34215

PCT Pub. Date: Oct. 31, 1996

[30] Foreign Application Priority Data

Apr. 25, 1995 [FR] France ................... 9504903

[51] Int. Cl.⁶ ................ F16D 55/04; F16D 65/02
[52] U.S. Cl. ........................................ 188/73.38
[58] Field of Search .................. 188/73.32, 73.36, 188/73.38, 280.6, 250 E

[56] References Cited

U.S. PATENT DOCUMENTS

| | | | |
|---|---|---|---|
| 3,139,157 | 6/1964 | Hodkinson | 188/73.32 |
| 3,486,589 | 12/1969 | Hillegass | 188/73.32 |
| 4,313,527 | 2/1982 | Pickel | 188/73.32 |
| 4,365,484 | 12/1982 | Bradley | 188/73.32 |
| 4,669,677 | 6/1987 | Nakatsubara | 188/73.38 |
| 4,858,728 | 8/1989 | Thiel et al. | 188/256 G |
| 4,928,579 | 5/1990 | Emmett | 188/73.38 |
| 5,289,963 | 3/1994 | Nagai et al. | 188/250 E |
| 5,381,875 | 1/1995 | Tsuvuta et al. | 188/250 E |
| 5,427,213 | 6/1995 | Weilev et al. | 188/250 E |
| 5,494,140 | 2/1996 | Weiler et al. | 188/73.38 |

FOREIGN PATENT DOCUMENTS

| | | | |
|---|---|---|---|
| 0440041 | 8/1991 | European Pat. Off. | 188/250 G |
| 2129511 | 5/1984 | United Kingdom | 188/73.78 |

*Primary Examiner*—Lee W. Young
*Assistant Examiner*—Chris Schwartz
*Attorney, Agent, or Firm*—Leo H. McCormick Jr.

[57] ABSTRACT

A device for attaching a disk-brake pad (2) to a piston (1) in a brake. The piston (1) has an opened internal volume (100) bordered by a chamfer (101) and exhibiting an internal peripherial widening (102). The device includes a passive fastening component (5) fastened to a backing (20) having an edge (50) detached from the backing (20) to define a gap (51) and an active fastening component (6) which is mounted to slide in the piston (1). The device is fastened to the pad (2) by first clips (61) inserted in the gap (51) and to the piston by second clips (62) inserted in the peripherial widening (102).

4 Claims, 2 Drawing Sheets

BRAKE PISTON AND PAD WITH AUTOMATIC COUPLING TOGETHER

The present invention relates to a device, for applying a braking force, which can be used in a disk brake and which comprises a brake piston exhibiting an open internal volume, a pad comprising a backing and intended to be applied against a disk by a movement of the piston in a first axial direction oriented along an axis of the piston, and fastening means with reversible effect at least partially housed in the internal volume of the piston, for securing a first face of the backing to this piston.

BACKGROUND OF THE INVENTION

A disk brake equipped with a device of this type is described, for example, in the patent U.S. Pat. No. 4,609,077.

Traditionally, devices of this type comprise, by way of fastening means, springs fastened permanently to the pad backing, exhibiting relatively long length and introduced into the internal volume of the piston at the moment when the brake is assembled.

Such an arrangement, which means that enough space has to be left between the disk and the pad to allow the springs to be introduced into the piston, is necessarily demanding in terms of space.

The object of the present invention is specifically to provide a device, for applying a braking force, which can be used in a disk brake and which does away with this drawback.

SUMMARY OF THE INVENTION

To this end, the device of the invention is essentially characterized in that the fastening means comprise: a chamfer bordering the internal volume of the piston; a peripheral widening of the internal volume of the piston, formed some distance from the chamfer; a passive fastening component fastened to the first face of the backing and exhibiting an edge detached from the backing to allow a gap to remain between this edge and the backing at several points; and an active fastening component mounted selectively to slide in the piston in a second axial direction opposite from the first, and including several clips of a first type and several clips of a second type, all the clips each exhibiting a peripheral branch housed in the internal volume of the piston and urged elastically in a first radial direction away from the axis of the piston, the peripheral branch of each clip of the first type pointing in the first axial direction and ending in a hook which has an active part turned towards the gap and capable of coming to bear against the first face of the backing, and a dorsal part initially bearing against the chamfer, the peripheral branch of each clip of the second type pointing in the second axial direction and ending in a relief, the clips having dimensions such that a movement of the piston in the first axial direction, carried out under initial conditions in which the pad is not yet fastened to the piston, causes: a displacement of the active fastening component in the second axial direction with respect to the piston, through the active part of each hook bearing against the first face of the backing; a displacement of each hook in a second radial direction, the opposite direction from the first, by the dorsal part of each hook being guided over the chamfer; corresponding insertion of the active part of each hook into the gap; and insertion of each relief in the widening of the internal volume of the piston.

According to a preferred embodiment of the invention, the active fastening component includes a central orifice slipped over a central guide pin of the piston.

Furthermore, this device includes for example three clips of the first type, uniformly spaced apart, and three clips of the second type interspersed between the clips of the first type and also uniformly spaced apart.

Further features and advantages of the invention will emerge clearly from the description thereof given hereafter by way of non-limiting indication with reference to the appended drawings.

DETAILED DESCRIPTION OF THE DRAWINGS

Figure 1:
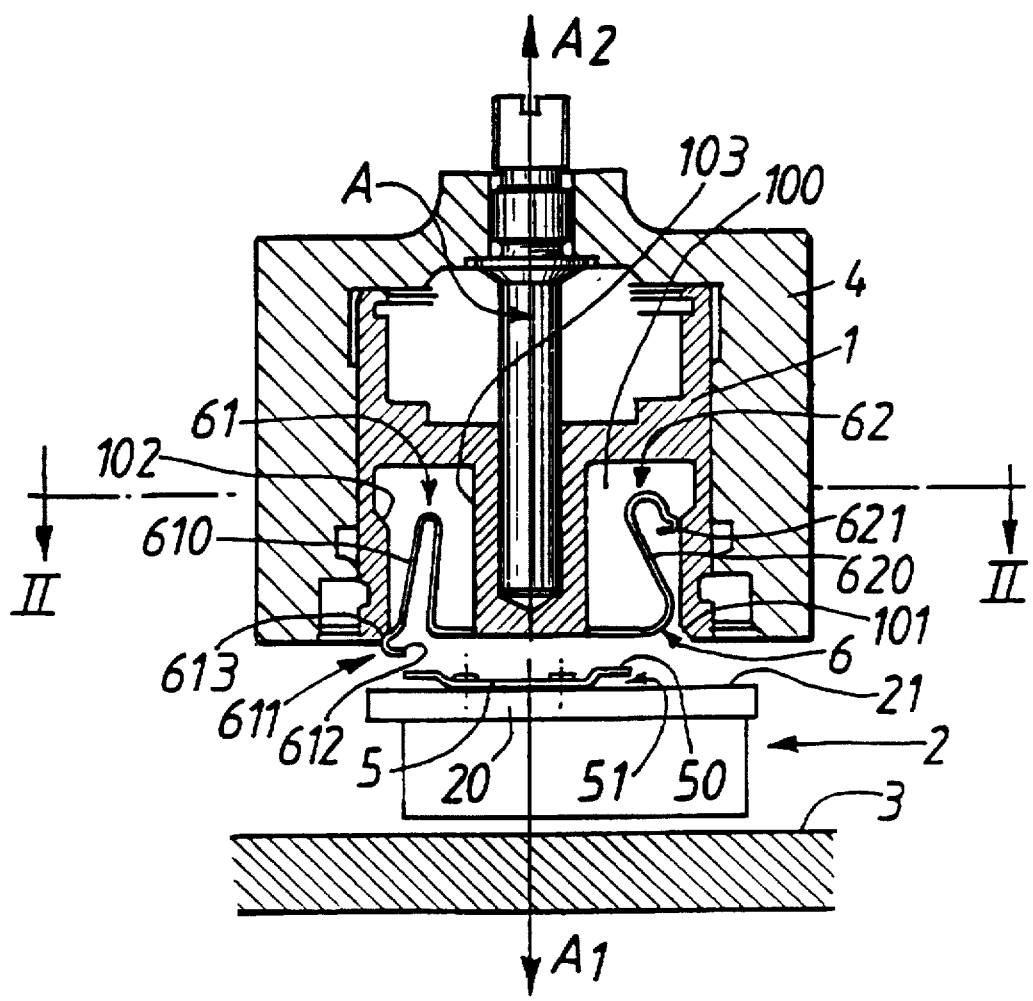
FIG. 1 is a diagrammatic section through a device in accordance with the invention, observed in an initial state.
Figure 2:
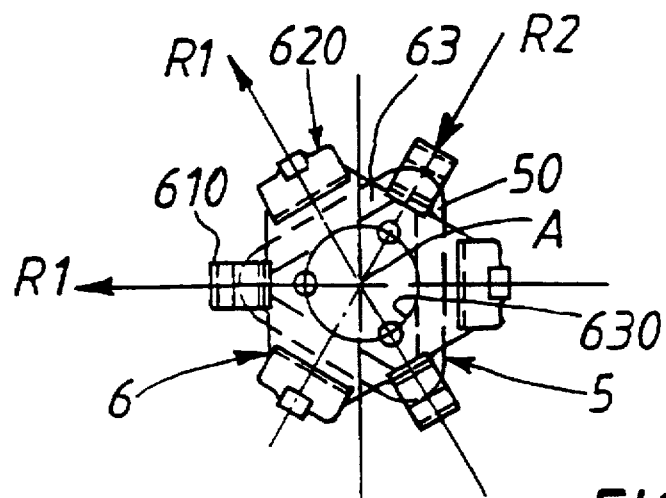
FIG. 2 is a plan view of the active and passive fastening components, observed in the direction of the line II—II of FIG. 1.

The device of the invention comprises, in a way known per se, a brake piston 1 exhibiting an open internal volume 100, a pad 2 comprising a backing 20 and intended to be applied against a disk 3 by a movement of the piston in a first axial direction A1 oriented along an axis A of the piston, and fastening means with reversible effect, which more particularly form the subject matter of the invention, which are at least partially housed in the internal volume 100 of the piston and which are designed to secure a first face 21 of the backing 20 to this piston 1.

As the expert also knows, the piston 1 is in fact mounted so that it can slide in a hydraulic cylinder 4, and its movement along the axis A1 is obtained by injecting pressurized fluid into the cylinder 4.

According to the invention, the fastening means comprise: a chamfer 101 bordering the internal volume 100 of the piston; a progressive peripheral widening 102 of the internal volume 100 of the piston, formed some distance from the chamfer 101; a passive fastening component 5 fastened to the first face 21 of the backing 20; and an active fastening component 6 mounted so as selectively to slide in the piston 1 in a second axial direction A2 opposite from the first.

The passive fastening component 5, which in the embodiment illustrated has the shape of a triangle with rounded corners, exhibits an edge 50 detached from the backing 20 to allow a gap 51 to remain between this edge 50 and the backing 20 at several points, or over its entire periphery, as illustrated.

The active fastening component 6 includes for example three clips of a first type, such as 61, and three clips of a second type, such as 62, all the clips each exhibiting a peripheral branch such as 610 and 620 housed in the internal volume 100 of the piston and urged elastically in a first radial direction, such as R1, away from the axis A of the piston 1.

The clips of the first and second type are uniformly angularly spaced apart, the clips of the second type furthermore being interspersed between the clips of the first type.

The active fastening component 6 moreover exhibits a central region 63 pierced by an orifice 630 via which it is slipped over a central guide pin 103 of the piston 1, this central region 63 providing the connection between the clips of the first and second type.

The peripheral branch 610 of each clip 61 of the first type points in the first axial direction A1 and ends in a hook 611 which on the one hand has an active part 612 turned towards the gap 51 and capable of coming to bear against the first face 21 of the backing 20 (see FIGS. 3 and 4) and, on the other hand, a dorsal part 613 initially bearing against the chamfer (see FIG. 1).

The peripheral branch 620 of each clip 62 of the second type points in the second axial direction A2 and ends in a relief 621.

Finally, the clips such as 61 and 62 have, especially with respect to the chamfer 101 and to the widening 102 of the internal volume 100 of the piston 1, dimensions that the expert will easily be able to choose to obtain the configurations illustrated in FIGS. 3 and 4 and commented upon in detail hereinbelow.

Figure 3:
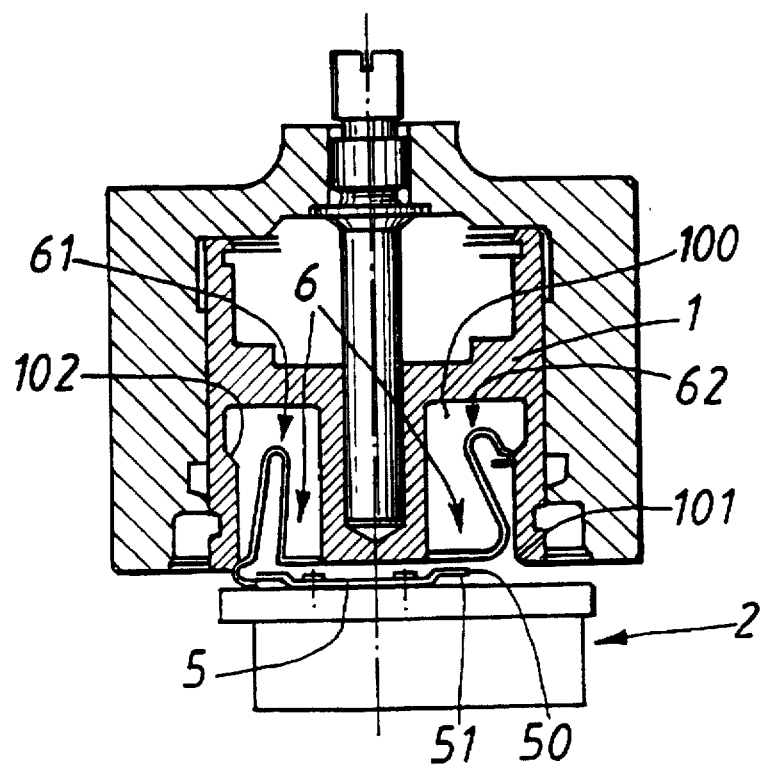
FIG. 3 is a section similar to that of FIG. 1, showing the device of the invention in an intermediate state.
Figure 4:
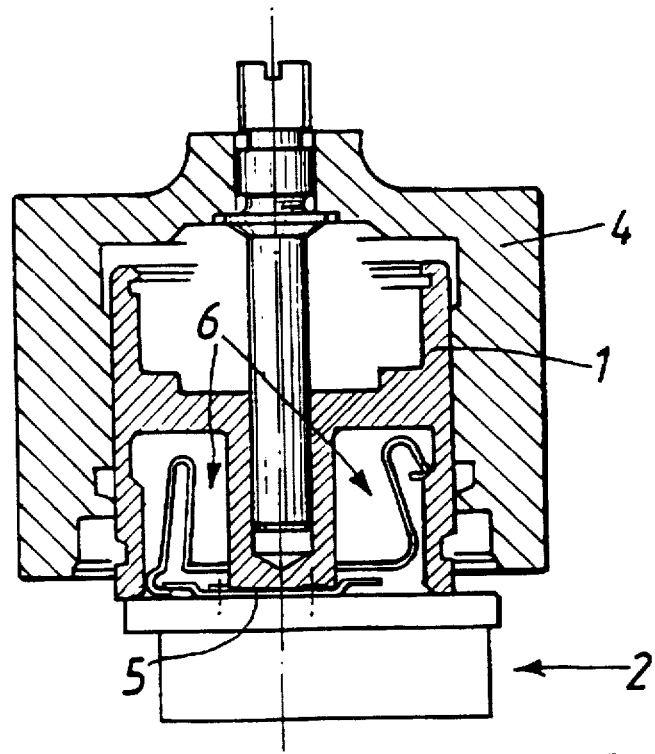
FIG. 4 is a section similar to that of FIG. 1, showing the device of the invention in a final state.

When the pad 2 is brought close to the piston 1, starting from a relative position represented in FIG. 1, the active part 612 of each hook of the active fastening component 6 comes to bear against the first face 21 of the pad backing 20, as FIG. 3 shows.

Assuming that the pad 2 is then bearing against the disk 3 or against an interposed component which is itself bearing against the disk 3, a movement of the piston in the first axial direction A1 then has the effect on the one hand of displacing the active fastening component 6 in the second axial direction A2 with respect to the piston, owing to the fact that the active part 612 of each hook is bearing against the first face 21 of the backing, and on the other hand a displacement of each hook 611 in a second radial direction, such as R2, the opposite direction from the first, by the dorsal part 613 of each hook 611 being guided over the chamfer 101, as well as corresponding insertion of the active part 612 of each hook into the gap 51 (FIG. 4), and finally insertion of the relief 621 of each clip of the second type into the widening 102 of the internal volume 100 of the piston 1, the latter movement allowing the component 6 to oppose any force which may be applied to the component 6 or to the pad 2 in the direction A1 with sufficient resistive force to allow the pad to remain fastened to the piston 1, except in the case in which this pad is deliberately removed to allow it to be replaced.

I claim:

1. A device for applying a braking force, comprising a brake piston exhibiting an open internal volume, a pad having a backing and intended to be applied against a disk by a movement of said piston in a first axial direction oriented along an axis of said piston and fastening means, at least partially housed in said internal volume of said piston, for reversibly securing a first face of said backing to said piston, characterized in that said fastening means comprise: a chamfer bordering said internal volume of said piston; a peripheral widening in said internal volume of said piston and formed some distance from said chamfer; said fastening means having an active fastening component and a passive fastening component, said passive fastening component being fastened to said first face of said backing and exhibiting an edge detached from said backing to allow a gap to remain between said edge and said backing at several points; said active fastening component being mounted selectively to slide in said piston in a second axial direction opposite from said first axial direction; said active fastening component including several clips of a first type and several clips of a second type, said first and second type clips each exhibiting a peripheral branch housed in said internal volume of said piston and urged elastically in a first radial direction away from an axis of said piston, said peripheral branch of each clip of said first type pointing in said first axial direction and ending in a hook, said hook having and active part and a dorsal part, said active part of each hook being turned towards said gap and capable of coming to bear against said first face of said backing, said dorsal part of each hook initially bearing against said chamfer, said peripheral branch of each clip of said second type pointing in said second axial direction and ending in a relief, said first and second type clips each having dimensions such that a movement of said piston in said first axial direction whenever said pad is not fastened to said piston causes a displacement of said active fastening component in said second axial direction with respect to said piston through said active part of each hook bearing against said first face of said backing and a displacement of each hook in a second radial direction opposite said first radial direction allowing said dorsal part of each hook to be guided over said chamfer; said displacement occurring on an insertion of said active part of each hook into said gap while said relief on each second type clip being inserted into said peripherial widening of said internal volume of said piston.

2. The device according to claim 1, characterized in that said active fastening component includes a central orifice which slides over a central guide pin of said piston.

3. The device according to claim 1 wherein said first type clips includes three clips which are uniformly spaced apart, and wherein said second type clips includes three clips which are uniformly interspersed between said first type clips.

4. The device according to claim 2 wherein said first type clips includes three clips which are uniformly spaced apart, and wherein said second type clips includes three clips which are uniformly interspersed between said first type clips.

* * * * *